United States Patent [19]

Sano et al.

[11] 4,295,657
[45] Oct. 20, 1981

[54] STEERING APPARATUS FOR VEHICLES

[75] Inventors: Shoichi Sano, Tokorozawa; Yoshimi Furukawa, Tokyo, both of Japan

[73] Assignee: Honda Giken Kogyo Kabushiki Kaisha, Tokyo, Japan

[21] Appl. No.: 107,718

[22] Filed: Dec. 28, 1979

[30] Foreign Application Priority Data

Dec. 29, 1978 [JP] Japan .................. 53-163681

[51] Int. Cl.³ ............................................ B62D 7/00
[52] U.S. Cl. .................................... 280/91; 180/79
[58] Field of Search ............................ 280/91; 180/79

[56] References Cited

U.S. PATENT DOCUMENTS

| 1,028,866 | 6/1912 | Eadie | 280/91 |
| 2,824,749 | 2/1958 | Yasuda | 280/91 |
| 4,105,086 | 8/1978 | Ishii et al. | 280/91 |

FOREIGN PATENT DOCUMENTS

| 216854 | 10/1938 | Switzerland | 280/91 |
| 216655 | 1/1942 | Switzerland | 280/91 |

Primary Examiner—Joseph F. Peters, Jr.
Assistant Examiner—Norman L. Stack, Jr.
Attorney, Agent, or Firm—Irving M. Weiner; Pamela S. Burt; John L. Shortley

[57] ABSTRACT

A steering apparatus for a four-wheeled vehicle including a pair of pivotable knuckle arms connected to a pair of respective front wheels and actuatable through a steering gear by rotational movement of a steering wheel. One of the knuckle arms is pivotally connected to one end of a connector rod extending longitudinally of the vehicle, the other end of the connector rod being connected to a cam plate slidable in a housing. The cam plate has an inverted S-shaped cam groove or alternatively an S-shaped cam groove within which is slidably received a pin mounted on a tie rod pivotally connected between a pair of pivotable support arms supporting a pair of rear wheels, respectively. Due to the shape of the cam groove, the rear wheels are turned in the same direction as the front wheels when the steering wheel is rotated through a relatively small angle, and the rear and front wheels are turned in opposite directions when the steering wheel is rotated through a relatively large angle.

8 Claims, 7 Drawing Figures

STEERING APPARATUS FOR VEHICLES

BACKGROUND OF THE INVENTION

1. Field of the Invention

The present invention relates generally to a steering apparatus for vehicles of the four-wheeled type. More particularly, the invention relates to a steering apparatus for turning rear wheels as well as front wheels of a vehicle by rotational movement of a steering wheel.

2. Description of Relevant Art

Four-wheeled vehicles are generally steered by turning front wheels with respect to the longitudinal axis of the vehicles. As the front wheels begin to be turned while the vehicle is running, an angle of slippage is developed at the front wheels, thereby producing a cornering force which causes the vehicle body to move transversely and to yaw about the center of gravity of the vehicle body.

An angle of slippage is generated at the rear wheels only after the vehicle body has started being displaced due to the yawing movement thereof. Therefore, a cornering force acts on the rear wheels a short interval of time after the cornering force has acted on the front wheels. In other words, there is a short time lag before a resultant combined cornering force on the front and rear wheels reaches a value the driver is expecting, resulting in one of the difficulties associated with driving a four-wheeled vehicle.

While the four-wheeled vehicle is steered to move around, the wheels are subjected to lateral slippage, such that the longitudinal axis or orientation of the vehicle tends to be out of alignment with a tangential line on an arcuate path upon which the vehicle moves, resulting in another difficulty associated with driving a four-wheeled vehicle.

In view of the foregoing difficulties, the driver of a four-wheeled vehicle must take into consideration a time lag between the turnings of the front and rear wheels, and an angular difference between the tangential line on the arc which the vehicle is to sweep, and the longitudinal axis of the vehicle. For proper and safe driving of four-wheeled vehicles, the driver must have considerable driving experience, because many traffic accidents result from movements of the vehicle which the driver does not fully expect at the time of steering operation.

The present invention overcomes the above described problems attendant conventional four-wheeled vehicles, and provides a steering apparatus wherein the rear wheels of the vehicle are also dirigible at the same time as the turning of the front wheels, and whereby the steering responsiveness is substantially improved.

SUMMARY OF THE INVENTION

The present invention provides a steering apparatus for a four-wheeled vehicle wherein a rotational movement of a steering wheel of the vehicle is converted into a straight-line motion through a steering gear for turning the front wheels of the vehicle, wherein the rear wheels of the vehicle are also dirigible, and means are provided for changing a turning direction of the rear wheels with respect to the front wheels of the vehicle, in response to the amount of rotation of the steering wheel of the vehicle.

In accordance with the present invention, the rear wheels of a vehicle are turnable first in one direction and then in the other direction in response to the amount of rotation of a steering wheel, which also causes the front wheels to be turned through a steering gear. A connector rod extending longitudinally of the vehicle has one end thereof pivotally connected to one of the knuckle arms for the front wheels, and the other end thereof connected to a cam plate having a cam groove in the shape of an inverted S or an S, in which there is slidably received a pin mounted on a tie rod pivotably connected to a pair of support arms supporting a pair of respective rear wheels. When the steering wheel is rotated, the front wheel is turned and, at the same time, the connector rod is longitudinally moved to displace the cam plate, whereupon the pin and thus the tie rod are laterally shifted due to the meandering shape of the cam groove, with the result that the rear wheels are also turned. The front and rear wheels are moved in the same direction when the steering wheel is turned through a relatively small angle, and in opposite directions when the steering wheel is rotated through a relatively large angle. With such an arrangement, the orientation of the vehicle substantially conforms to a tangential line on an arcuate path which the vehicle follows, regardless of how large or small the rotational angle of the steering wheel might be. Cornering forces act on the front and rear wheels at the same time, and the vehicle is subjected to a transverse acceleration the driver is expecting within a short period of time after rotation of the steering wheel.

It is an object of the present invention to provide a steering apparatus for a vehicle which overcomes the above-discussed problems attendant conventional four-wheeled vehicles.

Another object of the invention is to provide a steering apparatus wherein the rear wheels of a vehicle are also dirigible at the same time as the turning of the front wheels.

A further object of the present invention is to provide a steering apparatus for changing turning directions of rear wheels with respect to front wheels in response to the amount of rotation of a steering wheel.

Still another object of the present invention is to provide a steering apparatus which permits the driver to steer a four-wheeled vehicle with maximum ease.

The above and other objects and advantages of the present invention will become apparent from the following detailed description, when read in conjunction with the accompanying drawings which illustrate preferred exemplary embodiments of the invention.

DETAILED DESCRIPTION OF PREFERRED EMBODIMENTS

Figure 1:
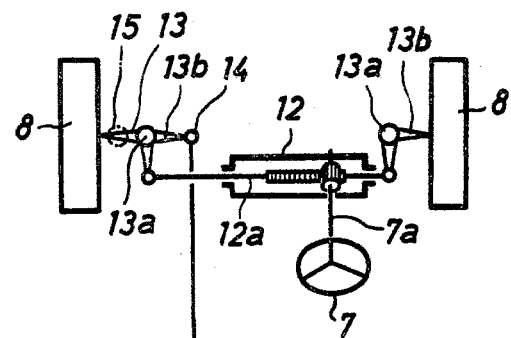
FIG. 1 is a schematic plan view of a steering apparatus in accordance with the present invention.

With reference to FIG. 1, a steering wheel 7 is connected through a steering shaft 7a to a steering gear 12 including a gear mechanism, such as a rack and pinion, which includes tie rod 12a which is movable in a straight line in a transverse direction through the steering gear 12, in response to rotation of steering wheel 7. The tie rod 12a is pivotally connected at its ends to a pair of support or knuckle arms 13, 13 pivotally mounted on a vehicle frame (not shown) by a pair of respective pivot pins 13a, 13a. A pair of front wheels 8, 8 are supported on the knuckle arms 13, 13, respectively. When the steering wheel 7 and thus the steering shaft 7a are rotated, the tie rod 12a is longitudinally moved to cause the knuckle arms 13, 13 to pivot about the pivot pins 13a, 13a, whereupon the front wheels 8, 8 are turned to the right or left. Such structure and operation is well known in the art.

Figure 2:
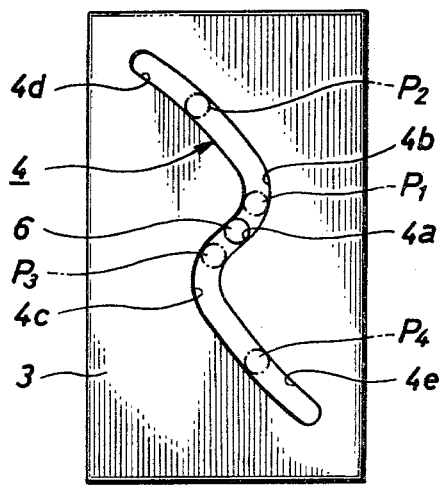
FIG. 2 is an enlarged plan view of a cam plate employed in the steering apparatus of FIG. 1.

One of the knuckle arms 13, which is shown on the left-hand side in FIG. 1, has an extension arm 13b extending away from the left-hand front wheel 8. A connector rod 1 is pivotally coupled at a front end thereof to the extension arm 13b by a pivot pin 14. The connector rod 1 extends longitudinally of the automotive vehicle and has the rear end thereof connected to a cam plate 3 slidably disposed in a rearwardly disposed housing 2. As shown in FIG. 2, the cam plate 3 has a meandering cam groove 4 substantially in the shape of an inverted S which includes a pair of lateral arcuate slot segments 4b, 4c extending in point-symmetric relation to each other; an intermediate slot segment 4a connecting the slot segments 4b, 4c together and extending at an angle to the longitudinal axis of cam plate 3; and a pair of substantially parallel slot segments 4d, 4e extending from the slot segments 4b, 4c, respectively, in opposite directions at an angle to the longitudinal axis of cam plate 3 such that the slot segments 4d, 4e extend in transverse relation to the intermediate slot segment 4a.

A pair of rear wheels 10, 10 are supported on a pair of support arms 11, 11 pivotally mounted on the vehicle frame by a pair of respective pivot pins 11a, 11a. The support arms 11, 11 are pivotally interconnected by a tie rod 5 having a pin 6 slidably received in the cam groove 4 in cam plate 3. Therefore, the movement of cam plate 3 in and along housing 2 causes pin 6 and thus the tie rod 5 to move longitudinally to an extent which is determined by lateral displacement of pin 6 with respect to cam plate 3. The rear wheels 10, 10 can also be turned or steered accordingly.

Operation of the steering apparatus of the present invention will be described hereinbelow.

When the steering wheel 7 is rotated in a clockwise direction, the resulting motion is transmitted down the steering shaft 7a to the steering gear 12, which then moves the tie rod 12a to the left. The front wheels 8, 8 are then turned to the right, causing the vehicle to make a right turn. At the same time, the connector rod 1 is longitudinally pushed rearwardly, to thereby slide the cam plate 3 rearwardly in housing 2. As cam plate 3 starts moving rearwardly, the pin 6 starts to move laterally in response to rearward movement of cam plate 3, from its initial position in the intermediate slot segment 4a to a position $P_1$, whereupon the tie rod 5 is shifted to the right. The rear wheels 10, 10 are thereby caused to turn to the right, in the same direction as the front wheels 8, 8. Upon continued clockwise rotation of steering wheel 7, the cam plate 3 is moved further rearwardly to cause pin 6 to move along cam groove 4 to the slot segment 4b, at which the rightward displacement of tie rod 5 is maximum, i.e., at which the turning angle of the rear wheels 10, 10 is the greatest. As clockwise rotation of steering wheel 7 is continued, the cam plate 3 continues to move rearwardly with the pin 6 being laterally shifted in the opposite direction along the slot segment 4d toward a position $P_2$, with the result that rear wheels 10, 10 begin now to be turned to the left. When steering wheel 7 is fully rotated, the turning angle of rear wheels 10, 10 is substantially the same as that of front wheels 8, 8, but in the opposite direction.

The mode of operation of the steering apparatus as a result of counter-clockwise turning of steering wheel 7 is substantially the same as described above, except that the pin 6 moves from the initial position thereof in the intermediate slot segment 4a through a position $P_3$ down the slot segment 4c toward a position $P_4$ in the slot segment 4e, and the front and rear wheels 8, 10 are turned or steered in opposite directions.

Accordingly, the rear wheels 10, 10 are first turned in one direction and then in the opposite direction in response to continued angular movement of steering wheel 7 in one direction.

In order to achieve a transverse acceleration necessary for steering a vehicle, the steering wheel is required to be rotated through a relatively large angle while the vehicle is running at low speeds, and through a relatively small angle while the vehicle is running at high speeds. With the steering apparatus of the present invention, the front and rear wheels are turned in the same direction when the steering wheel 7 is rotated through a relatively small angle, so that an angle of slippage and thus a cornering force are developed at the front and rear wheels simultaneously upon steering during high-speed operation of the vehicle. Therefore, the necessary transverse acceleration of the vehicle is attained in a short period of time, resulting in an improved steering responsiveness.

As the rotational angle of the steering wheel is increased at a lowered vehicle speed, the turning angle of the rear wheels is reduced and the steering responsiveness is not greatly improved. However, the steering responsiveness during low-speed operation of the vehicle is not of particular concern for practical purposes.

FIGS. 3 through 6 show a comparison as to steering operation between a vehicle equipped with the steering apparatus according to the present invention and a vehicle equipped with a conventional steering apparatus. Although the vehicles are shown as being two-wheeled, it will be understood that the illustration is applicable to a vehicle wherein the turning radius is sufficiently larger than a wheel track or tread.

Figure 5:
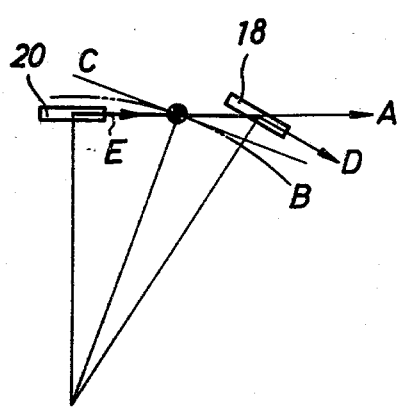
FIGS. 5 and 6 are diagrammatic views illustrating relations between the orientation and path of turning movement of an automotive vehicle equipped with a conventional steering apparatus.
Figure 6:
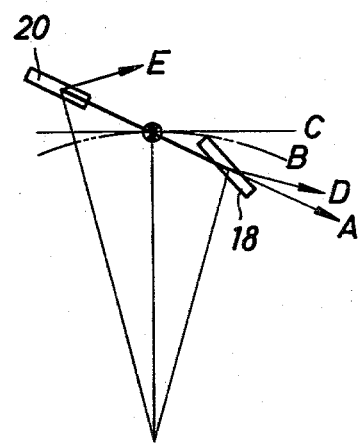

With reference to FIGS. 5 and 6, a vehicle having a front wheel 18 and a rear wheel 20 is steered by turning the front wheel 18 only. While the vehicle is steered at a low vehicle speed, the directions D, E of movment of the wheels are the same as the orientations, thereof, respectively, and the vehicle is oriented in a direction A directed radially outwardly of a line C tangent to the arcuate path B which the vehicle is to sweep, as shown in FIG. 5. As the vehicle speed is increased, an angle of slippage is developed at the front and rear wheels 18, 20, and the moving directions D, E of the wheels 18, 20 become directed radially outwardly of the respective orientations of the wheels (FIG. 6). Therefore, the center of the arcuate path of turning of the vehicle moves gradually forwardly, and the tangential line C on the arcuate path B is directed radially outwardly of the line of axis of the vehicle or the orientation A thereof.

Figure 3:
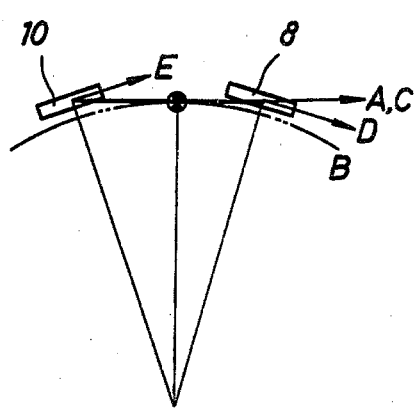

In accordance with the present invention, the front and rear wheels 8, 10 are turned in opposite directions while the vehicle is running at a low speed. With the cam groove 4 suitably shaped according to vehicle characteristics, the orientation A of the vehicle substantially conforms to the tangential line C on the arcuate path B for the vehicle, as shown in FIG. 3, thus effectively solving the prior art problem.

Figure 4:
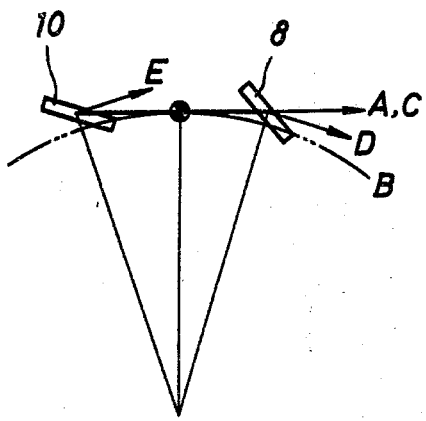
FIGS. 3 and 4 are diagrammatic views depicting relations between the orientation and path of turning movement of an automotive vehicle equipped with the steering apparatus in accordance with the present invention.

As the vehicle speed increases, the rear wheel 10 is turned in an opposite direction which is substantially the same as the direction of front wheel 8. As shown in FIG. 4, the vehicle orientation A substantially conforms to the tangential line C of the arcuate path B even when the vehicle is running at a high speed.

With the steering apparatus of the present invention, furthermore, the turning radius of the vehicle can be minimized. Generally, a limitation is imposed on the minimum turning radius of the vehicle because the brake hoses are arranged between the wheels and the vehicle body, the wheel housing dimensions are restricted, and the operating angle of coupling joint for coupling shafts is restricted where the dirigible wheels are engine-driven; thereby resulting in a limited rotating angle of the steering wheel. According to the present invention, however, because the front and rear wheels are turned in opposite directions during low-speed operation of the vehicle, the minimum turning radius of the vehicle can be reduced by substantially half. In addition, front and rear wheels roll on substantially the same arcuate path of the turning vehicle. A vehicle equipped with the steering apparatus of the present invention can therefore pass along a narrow road and be parked in a confined space with maximum ease.

Figure 2A:
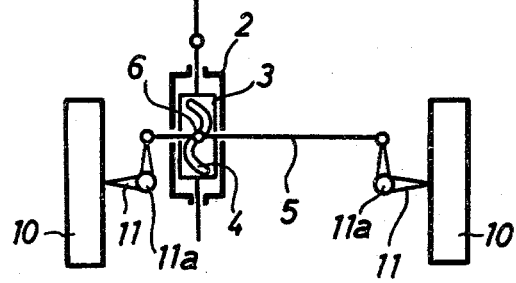
FIG. 2a is an enlarged plan view of a modified cam plate.

While in the above-described embodiment the cam groove 4 in cam plate 3 is substantially in the form of an inverted S, it may alternatively be substantially in the form of an S, as shown in FIG. 2a.

With the connector rod 1 pivotally connected to the lefthand knuckle arm 13 at a point 15 (FIG. 1), clockwise rotation of steering wheel 7 causes the connector rod 1 to move forwardly in the longitudinal direction thereof. When the cam groove 4' is shaped substantially in the form of an S as shown in FIG. 2a, such rearward movement of connector rod 1 results in turning of rear wheels 10, 10 to the right at first, and then to the left as in the previous embodiment.

Although certain preferred embodiments of the present invention have been shown and described in detail, it will be understood that changes and modifications may be made therein without departing from the scope of the invention as defined by the appended claims.

What is claimed is:

1. A steering apparatus for a four-wheeled vehicle wherein a rotational movement of a steering wheel of the vehicle is converted into a straight-line motion through a steering gear for turning the front wheels of the vehicle, wherein:

the rear wheels of the vehicle are also dirigible; and
means are provided for changing a turning direction of said rear wheels with respect to the front wheels of the vehicle, in response to the amount of rotation of said steering wheel, such that said rear wheels are concurrently turned in the same direction as said front wheels when said steering wheel is rotated through a relatively small angle, and in the opposite direction of said front wheels when said steering wheel is rotated through a relatively large angle.

2. A steering apparatus according to claim 1, comprising:

a cam member movable in response to the turning of said front wheels; and
a follower member engageable with said cam member for turning said rear wheels.

3. A steering apparatus according to claim 2, wherein:

said front wheels are supported on a pivotally movable support member coupled through a connector member with said cam member.

4. A steering apparatus according to claim 2, wherein:

said rear wheels are supported on a pair of pivotally movable support members, respectively, said follower member comprising a tie rod connecting said support members together.

5. A steering apparatus according to claim 2, wherein:

said cam member comprises a cam plate having a cam groove, said follower member having a pin slidably engaging in said cam groove.

6. A steering apparatus according to claim 5, wherein:

said cam groove includes a pair of lateral arcuate slot segments connected together and extending in substantial point-symmetric relation to each other.

7. A steering apparatus according to claim 6, wherein:

said cam groove is substantially in the form of an inverted S.

8. A steering apparatus according to claim 6, wherein:

said cam groove is substantially in the form of an S.

* * * * *